US012745717B1

(12) United States Patent
Luxenberg

(10) Patent No.: US 12,745,717 B1
(45) Date of Patent: Sep. 29, 2026

(54) MODULAR PLANTER

(71) Applicant: Ari Luxenberg, Manhattan Beach, CA (US)

(72) Inventor: Ari Luxenberg, Manhattan Beach, CA (US)

(73) Assignee: Ari Luxenberg, Manhattan Beach, CA (US)

( * ) Notice: Subject to any disclaimer, the term of this patent is extended or adjusted under 35 U.S.C. 154(b) by 0 days.

(21) Appl. No.: 19/350,996

(22) Filed: Oct. 6, 2025

Related U.S. Application Data

(63) Continuation-in-part of application No. 18/972,425, filed on Dec. 6, 2024, now abandoned.

(51) Int. Cl.
*A01G 9/02* (2018.01)

(52) U.S. Cl.
CPC .................................. *A01G 9/0302* (2025.01)

(58) Field of Classification Search
CPC .............................. A01G 9/026; A01G 9/0302
See application file for complete search history.

(56) References Cited

U.S. PATENT DOCUMENTS 1,542,683 A 6/1925 Everett
2,140,996 A 12/1938 Heifetz
4,216,622 A * 8/1980 Hollenbach .............. A01G 9/04 47/71
5,157,869 A * 10/1992 Minton .................. A01G 23/02 47/73
5,359,809 A * 11/1994 Johnson ................. A01G 23/02 47/73
7,278,238 B2 10/2007 Maniscalco et al.
9,010,020 B1 * 4/2015 Slusher .................... A01G 9/02
10,609,872 B2 * 4/2020 Rentzhog ................. A01G 9/02
11,596,110 B1 * 3/2023 Ribeiro .................. A01G 9/029

(Continued)

FOREIGN PATENT DOCUMENTS

GB 305222 1/1930

OTHER PUBLICATIONS

Mckenzie, Potato Harvest Planter, Aug. 6, 2024, https://www.ebay.com/itm/125281815642.

(Continued)

*Primary Examiner* — Joshua J Michener
*Assistant Examiner* — Henry Hooper Mudd
(74) *Attorney, Agent, or Firm* — Thomas | Horstemeyer, LLP

(57) ABSTRACT

A modular, preferably reusable planter that is adapted to be selectively moved between: (1) a first orientation in which the planter is substantially in the shape of flower pot; and (2) a second orientation in which: (a) the planter's sidewall is separated into multiple parts so that the sidewall can be separated from vegetation and the soil holding the vegetation's roots without disturbing the roots and soil, and (b) the various parts of the planter's sidewall are separated from the planter's base. The modular planter may include one or more fasteners, such as an elastomeric loops or hook-and-loop fasteners, that are configured to selectively maintain the modular planter in the first orientation, and to allow an individual to optionally quickly release the fastener so that they can quickly move the planter into the second orientation and remove vegetation and its roots and soil from the planter's interior.

7 Claims, 4 Drawing Sheets

(56) References Cited

U.S. PATENT DOCUMENTS

| | | | | |
|---|---|---|---|---|
| 2003/0213175 | A1* | 11/2003 | Rhindress | A01G 23/02 47/73 |
| 2006/0283852 | A1* | 12/2006 | Greiner | B65D 6/28 220/4.22 |
| 2007/0157513 | A1 | 7/2007 | Varney et al. | |
| 2011/0289838 | A1 | 12/2011 | Cirello | |
| 2017/0318913 | A1 | 11/2017 | Riordan et al. | |
| 2018/0343809 | A1 | 12/2018 | Sherman | |
| 2019/0364745 | A1* | 12/2019 | Soutullo | A01G 9/02 |
| 2020/0337248 | A1 | 10/2020 | Munt, III | |
| 2024/0164260 | A1 | 5/2024 | Contreras | |

OTHER PUBLICATIONS

Amazing Creation, Self Watering Planter, Aug. 6, 2024, https://www.amazon.com/Amazing-Creation-Windowsill-Rectangular-Succulents/dp/B0839LQRGD.

Veradek, V-Resin Indoor/Outdoor Taper Planter, Set of 2 (30 inch, Black), Aug. 6, 2024, https://www.amazon.com/V eradek-V-Resi n-Taper-Tall-Planter/dp/B077H5KVSJ.

* cited by examiner

MODULAR PLANTER

TECHNICAL FIELD

The present disclosure is generally related to modular planters for vegetation. Various embodiments are particularly suitable for use as reusable modular planters for use in a retail setting.

BACKGROUND

Currently, when garden plants or other vegetation are sold in a retail setting, the plants are planted in a disposable, single-use plastic container having holes in the bottom. When an individual returns home from the store, the individual typically removes the vegetation and the soil that the vegetation is planted in from the container, plants the vegetation, and either discards or recycles the container. In some cases where the individual is planting a full garden, this may result in the individual discarding 20 or more single-use plastic containers. This is wasteful and also effectively raises the price of each plant because the plant's price implicitly covers the cost of the container that it's planted in.

Removing plants from traditional planting containers can also be time consuming because plants' roots often grow through the holes in the bottom of the container and become tangled out of the bottom of the container. This may make it necessary to "massage" the container to separate the plant's roots and surrounding soil from the container so that the roots and soil can be removed in a single piece. This process can significantly increase the time that it takes to plant a garden.

Accordingly, there is a need for improved planting containers and related methods that reduce or eliminate the plastic container waste that is normally associated with retail plant sales. Additionally, there is a need for improved planting containers that allow individuals to remove plants from the containers quickly without damaging the plants' root systems.

SUMMARY

A planter assembly, according to various embodiments, comprises: (1) a first substantially rigid, curved side wall defining a first upper edge and a first lower edge; (2) a second substantially rigid, curved side wall defining a second upper edge and a second lower edge; and (3) a base, wherein the first and second curved side walls are configured to be moved between: (A) a first orientation, in which: (i) the first and second curved side walls cooperate to form a sidewall that is at least substantially in the shape of a truncated cone; and (ii) the first and second curved side walls cooperate to maintain the base in a substantially fixed (e.g., substantially horizontal) orientation adjacent their respective first and second lower edges; and (B) a second orientation in which the first and second curved side walls release the base from the substantially fixed orientation. In various embodiments, when the planter is in the second orientation, the base, the first curved side wall and the second curved side wall are physically separate from each other.

In particular embodiments, the planter assembly is configured to allow a user to: (A) when the planter assembly is in the first orientation, place the planter assembly in an upright position on a support surface so that the support surface supports a weight of the planter and vegetation disposed within the planter; and (B) while the planter assembly is in the first orientation and the planter and vegetation are being supported by the support surface, release at least one fastener so that the planter assembly moves into the second orientation and so that the first and second curved side walls release the base and soil disposed within the planter.

A multi-part planter assembly according to various embodiments comprises: (1) a plurality of physically separable side walls; and (2) a base that is dimensioned to be selectively held in place relative to the side walls when the side walls are selectively attached together about the base, wherein the planter assembly is configured so that, when vegetation is disposed in the muti-part planter assembly, the vegetation is positioned so that its weight is supported by the base and so that soil in which the roots of the vegetation are disposed is laterally supported by the plurality of side walls. In particular embodiments, the planter assembly further comprises at least one quick-release fastener that is configured for: (A) selectively attaching the side walls together; and (B) being selectively released by a user to allow the side walls to physically separate from each other and to thereby release the base from a substantially fixed position between the side walls. In various embodiments, the physically separable side walls are substantially rigid and curved.

A method of storing vegetation, according to various embodiments, comprises: (1) providing a multi-part planter assembly having a plurality of separable side walls and a base that is dimensioned to be selectively held in place relative to the side walls when the side walls are selectively attached together about the base; and (2) while the side walls are attached together about the base, providing vegetation disposed in the muti-part planter assembly so that the vegetation's weight is supported by the base and so that soil in which the roots of the vegetation are disposed is laterally supported by the plurality of side walls.

BRIEF DESCRIPTION OF THE DRAWINGS

In the course of this description, reference will be made to the accompanying drawings, which are not necessarily drawn to scale, and wherein.

DETAILED DESCRIPTION

Figure 1A:
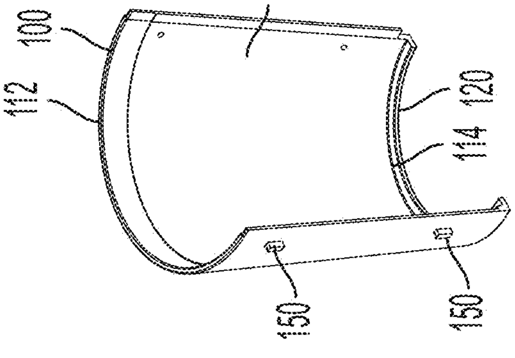
FIGS. 1A-1F are, respectively, perspective, top plan, left side elevation, rear elevation, right side elevation, and front elevation views of a side wall according to a particular embodiment. It is noted that, in particular embodiments such as the embodiment of FIGS. 3A-3E, the first and second side walls are structurally substantially identical.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Various embodiments address the challenges described above by providing a modular, preferably reusable planter 10 (see FIGS. 3A-3E) that is adapted to be selectively moved between: (1) a first orientation in which the planter 10 is substantially in the shape of a truncated cone; and (2) a second orientation in which: (a) the planter's sidewall 50 is separated into multiple parts so that the sidewall 50 can be separated from vegetation and/or the soil holding the vegetation's roots without disturbing the roots and soil, and (b) the various parts of the planter's sidewall 50 are separated from the planter's base 300. The modular planter may include one or more fasteners 400, such as an elastomeric loop or a hook-and-loop fastener, that are configured to selectively maintain the modular planter 10 in the first orientation, and to allow an individual to optionally quickly release the fastener 400 so that the individual can quickly move the planter 10 into the second orientation and remove vegetation and its roots and soil from the planter's interior.

As discussed below, in a particular embodiment, the planter 10 includes: (1) two substantially identical curved side walls 100 (See FIG. 1) that each define a support lip 120 adjacent the bottom of the curved side wall's respective interior surface; (2) a base 300; and (3) one or more fasteners 400 that are adapted for selectively maintaining the side walls 100 in an "assembled" orientation in which: (a) the side walls 100 are co-facing; (b) the respective forward side edges of the side walls 100 are aligned and engaged so that (i) the side walls 100 surround the base 300 (see FIGS. 3A-3E) and (ii) support the base 300 centrally between the side walls 100 on the respective side walls' support lips 120; and (c) the side walls 100 and base 300 cooperate to form a substantially soil-tight planter 10. Various embodiments of the side walls 100, base 300, and fasteners 400 are described in greater detail below.

Side Walls

As noted above, in various embodiments, the planter 10 includes a plurality of side walls 100 that, in various embodiments, may be substantially rigid and/or curved. For example, in the embodiment shown in FIGS. 1-4, the planter 10 includes two curved, substantially rigid side walls 100 that are dimensioned to fit together to form a continuous sidewall 50 that is substantially in the shape of a truncated cone (see FIG. 3A) with a substantially circular upper opening 52 and a substantially circular lower opening 54. In particular embodiments, the upper opening 52 has a larger radius than the lower opening 54. In various embodiments, the radius of the upper opening 52 may be between about 2 and about 12 inches, and the radius of the lower opening 54 may be between 1.5 and 11.5 inches.

In particular embodiments, when the two side walls 100 are positioned to fit together as discussed above (and shown in FIG. 3A), the respective forward side edges of the side walls 100 engage each other along substantially the entire length of their respective lateral edges 130, 140. To facilitate this engagement, in various embodiments such as the embodiment shown in FIGS. 1A-1F, each side wall 100 includes: (1) an elongated attachment tab 132 that extends outwardly from its first lateral edge 130 (e.g., along substantially the entire length of the first lateral edge 130); and (2) an elongated attachment recess 142 that is defined adjacent its second lateral edge 140 (e.g., along substantially the entire length of the second lateral edge 140), and that is adapted for snuggly receiving a corresponding elongated attachment tab 132.

Accordingly, when the two side walls 100 are positioned to fit together as described above, the first side wall's attachment tab 132 fits snuggly into the second side wall's attachment recess 142. Similarly, the second side wall's attachment tab 132 fits snuggly into the first side wall's attachment recess 142. This provides lateral support and increased soil impermeability when the first and second side walls 100 are attached together in an assembled orientation as discussed below.

Figure 1B:
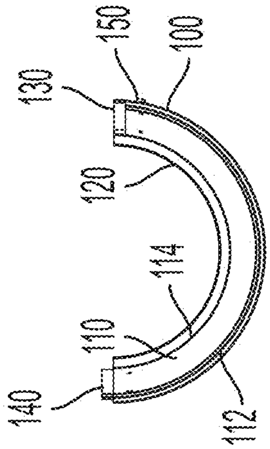
Figure 1C:
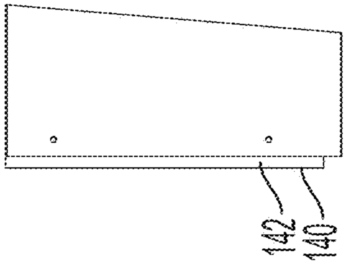
Figure 1D:
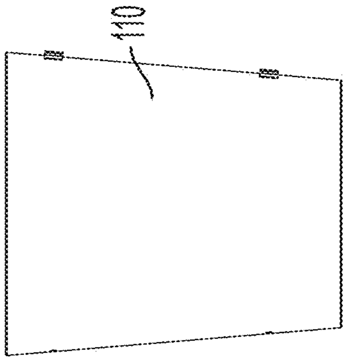
Figure 1E:
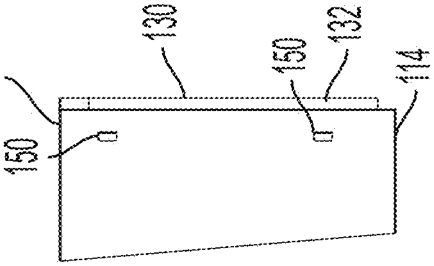
Figure 1F:
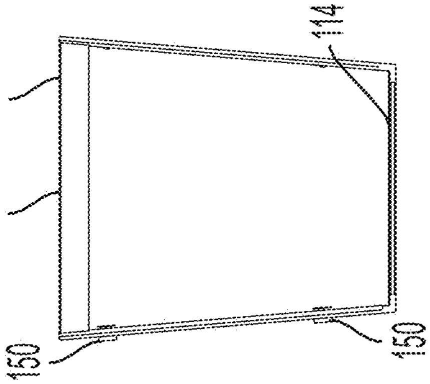

As shown in FIGS. 1A and 1B, each side wall 100 may include a support lip 120 that is positioned adjacent the side wall's respective bottom edge 114. In particular embodiments, this support lip 120 may be substantially planar and extend substantially perpendicularly a fixed distance (e.g., between about ½ inch and about ½ inch) from the side wall's bottom edge 114 along an arc that extends, for example, substantially the entire length of the side wall's bottom edge 114. In alternative embodiments, the support lip 120 may not extend the full length of the side wall's bottom edge 114 or there may be multiple shorter support lip portions that extend along the length of the side wall's bottom edge 114 with a respective space in between each adjacent pair of support lip portions.

In particular embodiments, each support lip 120 is dimensioned and adapted to at least partially support a weight of the planter's base 300 when the planter is in the first orientation, in which the planter's base 300 may be substantially horizontal when the planter 10 is in an upright position. Each support lip 120 may be further dimensioned and adapted to not support a weight of the planter's base 300 when the planter 10 is in the second "disassembled" orientation described above. As may be understood from FIGS. 1-4, the first and second support lips 120 may each be at least substantially in the shape of an arc having a radius that is less than the radius of the base 300. Furthermore, the support lips 120 may be adapted to maintain the base 300 in a substantially horizontal orientation when the planter 10 is upright and in the first, "assembled" orientation.

As shown in FIGS. 1-4, each side wall 100 may include one or more protrusions 150 that extend outwardly from a position adjacent the side wall's first lateral edge 130. For example, as shown in FIG. 1E, each side wall 100 may include two protrusions 150 adjacent the first lateral edge 130, where the first protrusion 150 is disposed adjacent a top edge 112 of the side wall 100 and the second protrusion 150 is disposed adjacent a bottom edge 114 of the side wall 100. In particular embodiments, the first and second protrusions 150 are dimensioned and configured to engage with a fastener 400 to facilitate maintaining the two side walls 100 in a fixed orientation (e.g., such as the orientation described above) relative to each other.

In various embodiments, the side walls 100 may have a substantially uniform thickness or have a thickness that varies in certain portions. In a particular example, each side wall 100 may be slightly thicker along its upper edge to create an upper lip to facilitate easier handling of the planter 10.

In particular embodiments, the side walls 100 are substantially rigid yet slightly flexible and/or malleable to accommodate the growth and expansion of vegetation within the planter 10. The side walls 100 may, for example, be made of a rigid but slightly flexible plastic material or other suitable substantially rigid yet slightly flexible and/or malleable material. For example, the side walls 100 may be sufficiently malleable to expand as vegetation grows within the planter 10.

Base

As discussed above, in particular embodiments, the planter 10 includes a base 300 that is dimensioned and adapted to support soil and vegetation that is disposed within the planter's interior when the planter 10 is in an assembled orientation. In particular embodiments, such as the embodiment shown in FIGS. 2A-2D, the base 300 is substantially in the form of a short cylinder having a height and radius. As shown in FIG. 2C, in various embodiments, the base's sidewall 302 is sloped slightly from the base's bottom surface 312 to the base's top surface 310 so that the radius of the base's substantially circular top surface 310 is greater than the radius of the base's substantially circular bottom surface 312.

Figure 2B:
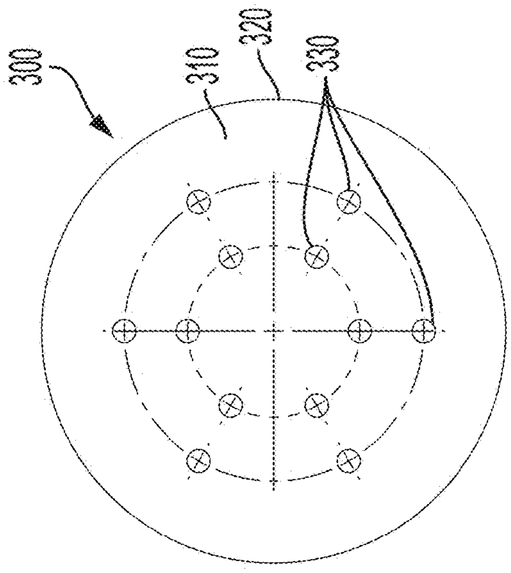
FIGS. 2A-2D are, respectively, perspective, top plan, side elevation, and bottom plan views of the base of the planter according to a particular embodiment—it is noted that, in various embodiments such as the embodiment shown, the base is symmetrical about its central axis.
Figure 2D:
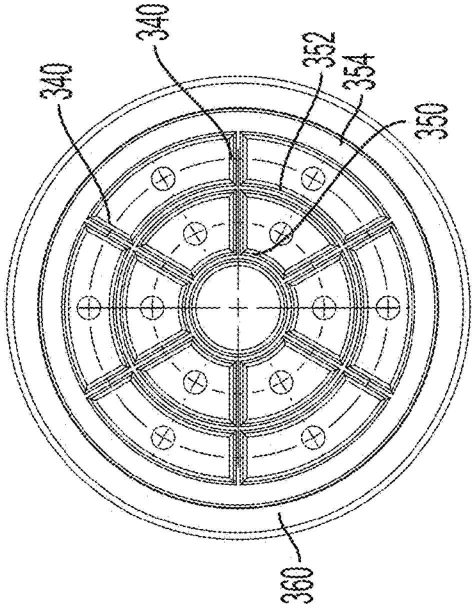
Figure 2A:
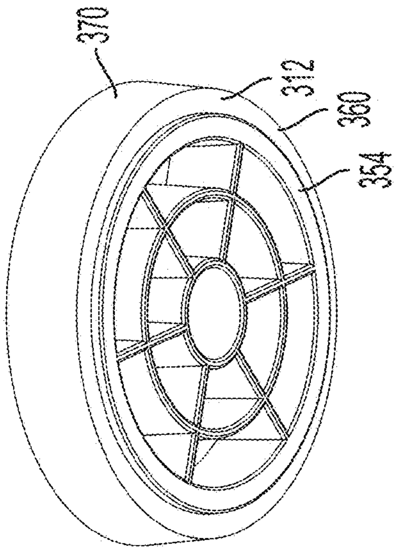
Figure 2C:
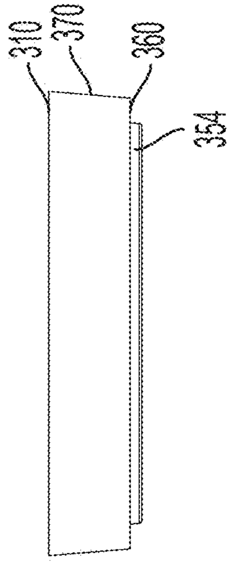

As shown in FIGS. 2B and 2C, the top surface 310 of the base 300 may be substantially planar and may include a plurality of drainage openings 330 (e.g., drainage holes) distributed (e.g., substantially evenly and/or symmetrically) throughout the area of the base's top surface 310 to permit soil disposed within the planter's interior to drain when vegetation within the planter is watered. In particular embodiments, the top surface 310 of the base 300 is substantially horizontal when the planter is upright and in the "assembled" orientation.

As shown in FIGS. 2A and 2C, the base 300 further includes plurality of substantially planar radial supports 340 that extend downwardly from the bottom of the base's top surface 310 to a vertical position that is substantially vertically in-line with the base's bottom surface 312. The base 300 further includes a plurality of substantially co-centric circular supports 350, 352 that also extend downwardly from the bottom of the base's top surface 310 to a vertical position that is vertically substantially in-line with the base's bottom surface 312. As shown in FIG. 2D, in particular embodiments, these circular supports 350, 352 are substantially co-centric with the base 300.

As shown in FIG. 2D, the various radial supports 340 may extend radially between the first and second circular supports 350, 352, and also extend between the second circular support 352 and a support ring 354 defined on a bottom surface of the base 300. This support ring 354 may be substantially co-centric with both the base itself and the two circular supports 350, 352.

As shown in FIGS. 2A and 2D, the base 300 further includes a substantially circular outer bottom ring 360 that is co-centric with, recessed from and immediately adjacent the support ring 354. In particular embodiments, the outer bottom ring 360 has about the same radius as the lower interior portion of the planters' sidewall 50, and the outer bottom ring 360 has a thickness that is about the same as the thickness of the respective support lips 120 of the planter's side walls 100. In addition, the support ring 354 may have a radius that is about the same as the radius of the sidewalls' lower opening 54, which is defined by the respective outer surfaces of the respective support lips 120. This may allow the support ring 354 to facilitate maintaining the base 300 laterally in place relative to the sidewall 50 due to the lateral contact between the support ring 354 and the portions of the support lips 120 that define the sidewall's lower opening 54.

Fasteners

As noted above, in various embodiments, the planter 10 includes at least one fastener 400, which, in various embodiments is a "quick-release" fastener such as an elastomeric loop or hook and loop fastener, that is configured to selectively maintain the modular planter 10 in the "assembled" orientation, and to allow an individual to optionally quickly release the fastener(s) 400 so that the individual can quickly move the planter 10 into the "disassembled" orientation and remove vegetation and its roots and soil from the planter's interior.

In the embodiment of FIGS. 1-4, the planter 10 comprises two fasteners on each side of the planter. In particular, the planter 10 comprises two elastomeric rings having a base portion 410, and an elastomeric portion 430 that defines an opening 420. As shown in FIGS. 3A-3C, each side wall 100 may include two fasteners 400 adjacent the side wall's second lateral edge 140, where a first fastener 400 is disposed adjacent a top edge 112 of the side wall 50 and a second fastener 400 is disposed adjacent a bottom edge 114 of the sidewall 50. In particular embodiments, each fastener 400 is disposed at about the same height on the sidewall 50 as a respective one of the first and second protrusions 150. This allows a user to laterally stretch the respective elastomeric ring of each of the fasteners 400 over a respective one of the protrusions 150 that is immediately laterally opposite to it on the assembled sidewall 50 so that the distal end of the elastomeric ring 400 substantially surrounds at least a portion of the respective protrusion 150 and so that tension in the elastomeric portion 430 maintains the elastomeric ring 400 in place adjacent the protrusion 150. When all four fasteners 400 are fastened in this manner, the fasteners 400 cooperate to maintain the two side walls 100 in a fixed orientation relative to each other (e.g., as they are in the "assembled" orientation discussed above).

In particular embodiments, one or more of the fasteners 400 is an adaptive fastener that is physically adapted to be easier to open and/or close than a conventional fastener (e.g., by a physically disabled individual and/or an individual with arthritis or other condition that makes it difficult to open and/or close standard fasteners). For example, one or more of the fasteners 400 (e.g., all of the fasteners 400) is (1) an arthritis-friendly fastener; (2) an easy-open fastener; (3) a one-handed fastener; (4) an easy-grip fastener; (5) a magnetic fastener; and/or (5) a hook-and-loop fastener. This feature may advantageously allow an elderly or disabled individual to quickly open and/or close the planter 10 without assistance.

Assembly and Uses

Figure 3A:
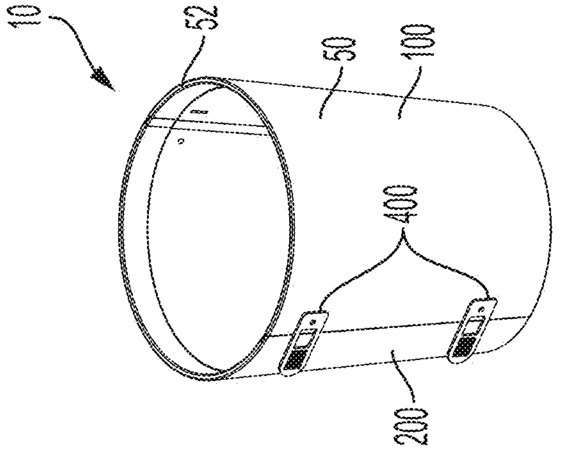
FIGS. 3A-3E are, respectively, perspective, top plan, rear side elevation, front side elevation, and bottom plan views of a modular planter according to a particular embodiment.
Figure 3B:
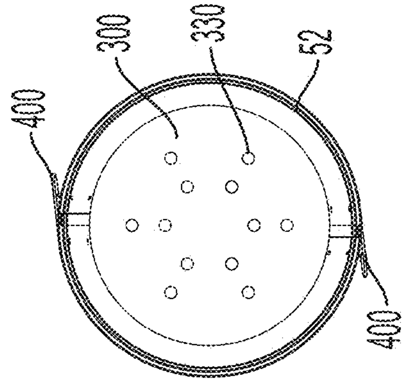
Figure 3C:
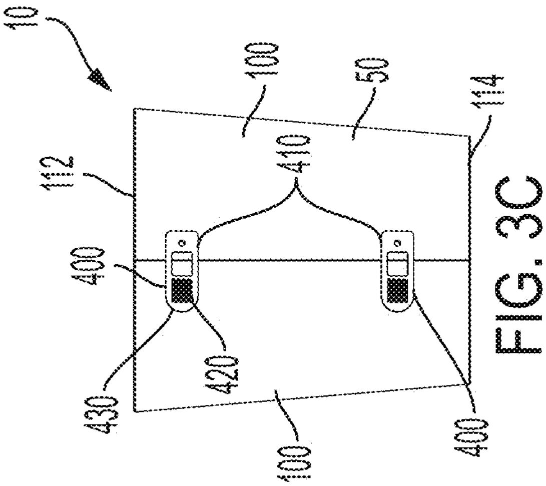
Figure 3D:
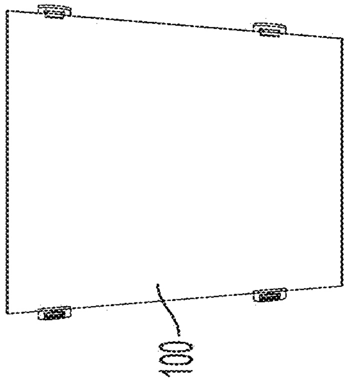
Figure 3E:
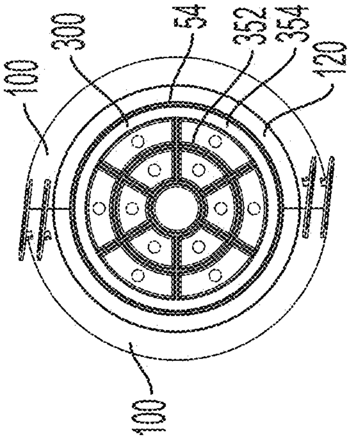
Figure 4:
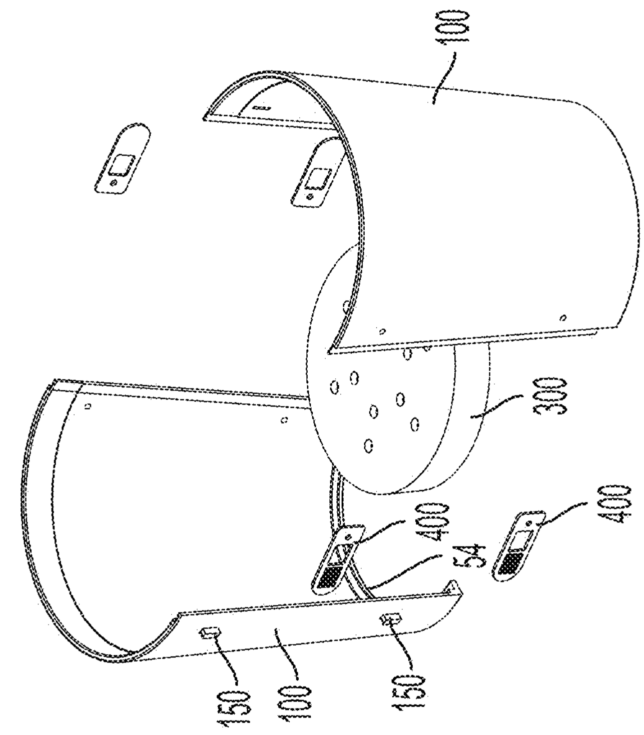
FIG. 4 is an exploded view of the modular planter of FIGS. 3A-3E.

To use the planter 10, a user first assembles two of the side walls 100 into the orientation described above in which the two side walls 100 are attached together by four fasteners 400 to form a substantially uniform, soil-tight sidewall 50 as shown in FIG. 3A. The user then orients the base 300 so that its top surface 310 is facing upward, and then drops the base 300 through the sidewall's upper opening 52 so that the support ring 354 extends through the sidewall's lower opening 54 and so that the base's outer bottom ring 360 is supported by the respective side walls' support lips 120. In this orientation, in various embodiments, the outer lateral surface of the base's support ring 354 is immediately adjacent the inner surface of the portion of the support lip 120 that defines the lower opening 54 so that there is no substantial gap between the outer lateral surface of the base's support ring 354 and the inner surface of the portion of the respective support lips 120 that define the lower opening 54. In this orientation, the two side walls 100 and the base cooperate to form a substantially soil-tight planter in which the upper surface of the base 300 defines a bottom interior surface of the planter 10.

Once the planter 10 is in this "assembled" orientation, a user may fill the planter 10 with soil and plant seeds and/or vegetation in the soil. To remove a plant (or other vegetation) from the planter 10, a user simply places the planter 10 on a suitable horizontal surface, disengages the planter's fasteners 400, and shifts the planter 10 into a "disassembled" orientation by pulling the two side walls 100 away from both each other and the base 300. This typically leaves a cohesive planter-shaped mass of soil standing freely on the base 300 with the vegetation protruding from the top of the mass of soil. The user then simply lifts the mass of soil from the base 300 and plants the vegetation in another desirable location and/or container. The user may then reassemble and facilitate re-use of the planter 10 (e.g., by reusing the planter 10 or by returning the planter 10 to the store where they bought the plant that was in the planter 10).

As noted above, a particular use for the planter may be in the context of retail plant or tree sales. In this context, a nursery or other store may sell plants in the reusable planters 10 and offer a reward (e.g., the return of a previously provided deposit or a store credit) in exchange for the user returning the reusable planter 10 to the store. The store may then facilitate the re-use of the planter 10 in the context of a future plant or tree sale. It is envisioned that a single planter 10 may be used tens or hundreds of times in this context, which would save customers time in planting their newly acquired plants/trees and also eliminate a significant amount of plastic waste.

Example Variations

Although various embodiments are described above as having curved side walls 100, it should be understood that similar planters having the same functionality could be any suitable shape. For example, rather than having curved side walls 100, the planter could alternatively have substantially straight side walls and have a substantially square, triangular, rectangular, or any other suitably shaped top opening (as defined by the planters' respective side walls) and base.

Similarly, although the side walls 100 are described in various embodiments as having a support lip 120 to support the planter's base 300, in various embodiments, the planter may be dimensioned so that the base 300 is held in place by friction between the sides of the base 300 and the interior of the assembled sidewall 50.

Also, although in various embodiments described above the planter has only two side walls, in other embodiments, the planter may have any suitable number of side walls (e.g., three, four, five, etc.). In addition, although the side walls are described as being physically separate from each other when the planter is in a disassembled orientation, in other embodiments, the side walls may be attached together via a suitable connector such as a hinge so that the side walls may be released from the planter's base and the soil within the planter, but still stay attached as a single unit. This may be advantageous in maintaining the side walls together during storage or transportation. In various embodiments, the side walls are attached together via a vertical hinge that is attached to a first lateral edge of the first side wall and a second lateral edge of the second side wall. This may allow the first and second side walls to be selectively rotated with respect to each other about the hinge.

Furthermore, although the fasteners 400 are described above as being elastomeric loops, it should be understood that any suitable fastener may be used including one or more hook and loop fasteners, one or more rubber bands, one or more straps with snaps, a direct snap-fit arrangement between the respective side walls 100, or any other suitable fastener.

In addition, although the planter is described as being substantially soil tight, in other embodiments, the planter may not be substantially soil tight. Also, although the planter is described as having drainage holes, various embodiments may not include drainage holes.

Also, although the planter is described above as being used in a retail context, it should be understood that various embodiments may be made only for home use.

It should be understood in light of this disclosure that the side walls and base may be made of any suitable material or combination of materials such as plastic, wood, metal, fiberglass, or any other suitable material such as a ceramic material.

In the context of this disclosure and the related claims, the terms "adapted to" and "adapted for" and similar terms mean specifically designed or constructed to be used in a particular way or for a particular purpose.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A plantar assembly comprising:

a first sidewall comprising:

an upper edge;

a lower edge;

a first lateral edge comprising an elongated attachment tab extending outwardly from the first later edge along at least a portion of the first lateral edge;

a second lateral edge defining an elongated attachment recess along at least a portion of the second lateral edge;

a first elastomeric member having a first base portion that is attached adjacent the upper edge of the first sidewall along the first lateral edge, and a first elastomeric ring defining a first opening that extends at least partially beyond the first lateral edge;

a second elastomeric member having a second base portion that is attached adjacent the lower edge of the first sidewall along the first lateral edge, and a second elastomeric ring defining a second opening that extends at least partially beyond the first lateral edge;

a first protrusion that extends outwardly from a surface of the first sidewall adjacent the upper edge and along the second lateral edge, wherein the first protrusion is dimensioned to extend within the first opening;

a second protrusion that extends outwardly from a surface of the first sidewall adjacent the lower edge and along the second lateral edge, wherein the second protrusion is dimensioned to extend within the second opening;

a second sidewall that is structurally identical to the first sidewall, wherein:

the elongated attachment recess of the first sidewall is adapted to receive a corresponding attachment tab of the second sidewall;

the elongated attachment tab of the first sidewall is adapted to engage with a corresponding attachment recess of the second sidewall;

the first sidewall and the second sidewall are configured to cooperate to form a truncated cone in which:

the first lateral edge of the first sidewall engages the second lateral edge of the second sidewall;

the second lateral edge of the first sidewall engages the first lateral edge of the second sidewall;

the first elastomeric member of the first sidewall engages the first protrusion of the second sidewall;

the second elastomeric member of the first sidewall engages the second protrusion of the second sidewall;

the first elastomeric member of the second sidewall engages the first protrusion of the first sidewall; and the second elastomeric member of the second sidewall engages the second protrusion of the first sidewall.

2. The plantar assembly of claim 1, wherein, the upper edge is longer than the lower edge.

3. The plantar assembly of claim 2, wherein the upper edge is semi-circular, the lower edge is semi-circular, and the upper edge has a radius that is greater than a radius of the lower edge.

4. The plantar assembly of claim 1, wherein the first sidewall comprises a base support lip that extends a length of the lower edge such that when the first sidewall and the second sidewall are cooperating to form the truncated cone, the plantar assembly comprises a continuous support lip along the lower edge of the first sidewall and the second sidewall.

5. The plantar assembly of claim 4, wherein:

the plantar assembly further comprises a circular base dimensioned to correspond to a circle formed by the lower edge of the first sidewall and the lower edge of the second sidewall when the first sidewall and the second sidewall are cooperating to form the truncated cone; and the first sidewall, the second sidewall, and the continuous support lip are configured to support the circular base adjacent the lower portion of the first sidewall and the lower portion of the second sidewall when the first sidewall and the second sidewall are cooperating to form the truncated cone.

6. The plantar assembly of claim 1, wherein:

the first elastomeric member is spaced apart from the upper edge a first distance;

the first protrusion is spaced apart from the upper edge a second distance; and the first distance corresponds to the second distance.

7. The plantar assembly of claim 6, wherein:

the second elastomeric member is spaced apart from the lower edge a third distance;

the second protrusion is spaced apart from the lower edge a fourth distance; and the third distance corresponds to the fourth distance.

* * * * *